United States Patent
Okada et al.

(10) Patent No.: US 7,430,321 B2
(45) Date of Patent: Sep. 30, 2008

(54) SYSTEM AND METHOD FOR VOLUMETRIC TUMOR SEGMENTATION USING JOINT SPACE-INTENSITY LIKELIHOOD RATIO TEST

(75) Inventors: Kazunori Okada, Plainsboro, NJ (US); Umut Akdemir, Hamilton, NJ (US); Arun Krishnan, Exton, PA (US)

(73) Assignee: Siemens Medical Solutions USA, Inc., Malvern, PA (US)

( * ) Notice: Subject to any disclaimer, the term of this patent is extended or adjusted under 35 U.S.C. 154(b) by 659 days.

(21) Appl. No.: 11/184,590

(22) Filed: Jul. 19, 2005

(65) Prior Publication Data

US 2006/0050958 A1 Mar. 9, 2006

Related U.S. Application Data

(60) Provisional application No. 60/625,027, filed on Nov. 4, 2004, provisional application No. 60/608,499, filed on Sep. 9, 2004.

(51) Int. Cl.
G06K 9/34 (2006.01)
(52) U.S. Cl. ............... 382/173; 382/128; 382/190; 382/199; 382/274
(58) Field of Classification Search ............... 382/110, 382/128, 173, 190, 199, 274; 348/809; 128/922; 250/455
See application file for complete search history.

(56) References Cited

U.S. PATENT DOCUMENTS

| | | | |
|---|---|---|---|
| 2004/0013292 A1 | 1/2004 | Raunig | |
| 2004/0022438 A1* | 2/2004 | Hibbard | 382/199 |
| 2004/0253649 A1* | 12/2004 | Smith | 435/7.2 |
| 2005/0170528 A1* | 8/2005 | West et al. | 436/518 |
| 2007/0185656 A1* | 8/2007 | Schadt | 702/19 |
| 2008/0002873 A1* | 1/2008 | Reeves et al. | 382/133 |

OTHER PUBLICATIONS

Okada, Kazunori et al. "Scale Selection for Anisotropic Scale-Space: Application to volumetric Tumor Characterization," *Proceedings of the 2004 IEEE Computer Society Conference on Computer Vision and Pattern Recognition*, vol. 1, Jun. 27, 2004 pp. 594-601 XP010708815 Abstract.

Dugas-Phocion G. et al., "Hierarchical segmentation of multiple sclerosis lesions in multi-sequence MRI,"*Biomedical Imaging: Macro to Nano, 2004 IEEE International Symposium on Arlington, VA*, Apr. 15-18 pp. 157-160; XP010773821 Abstract.

Okada K et al., "Robust 3D segmentation of Pulmonary Nodules in Multislice CT Images," *Lecture Notes in Computer Science*, Sep. 26, 2004 vol. 3217, pp. 881-889 XP008047180 Abstract.

Okada K et al., "Blog Segmentation Using Joint Space-Intensity Likelihood Ratio Test: Application to 3D Tumor Segmentation," *Computer Vision and Pattern Recognition*, Jun. 20, 2005, pp. 437-444, XP010817630 Abstract.

International Search Report.

* cited by examiner

*Primary Examiner*—Matthew C. Bella
*Assistant Examiner*—Ali Bayat

(57) ABSTRACT

A method for segmenting a digitized image includes providing a digitized volumetric image comprising a plurality of intensities corresponding to a domain of points in an N-dimensional space, identifying a target structure in said image, forming a window about said target structure whose size is a function of the target scale, and performing a joint space-intensity-likelihood ratio test at each point within said window to determine whether each said point is within said target structure.

32 Claims, 5 Drawing Sheets

SYSTEM AND METHOD FOR VOLUMETRIC TUMOR SEGMENTATION USING JOINT SPACE-INTENSITY LIKELIHOOD RATIO TEST

CROSS REFERENCE TO RELATED UNITED STATES APPLICATIONS

This application claims priority from "Volumetric Tumor Segmentation using Space-Intensity Joint Likelihood Ratio Test", U.S. Provisional Application No. 60/608,499 of Okada, et al., filed Sep. 9, 2004, and from "Blob Segmentation using Joint Space-Intensity Likelihood Ratio Test: Application to 3D Tumor Segmentation", U.S. Provisional Application No. 60/625,027 of Okada, et al., filed Nov. 4, 2004, the contents of both of which are incorporated herein by reference.

TECHNICAL FIELD

This invention is directed to object segmentation in digitized medical images.

DISCUSSION OF THE RELATED ART

The diagnostically superior information available from data acquired from current imaging systems enables the detection of potential problems at earlier and more treatable stages. Given the vast quantity of detailed data acquirable from imaging systems, various algorithms must be developed to efficiently and accurately process image data. With the aid of computers, advances in image processing are generally performed on digital or digitized images.

Digital images are created from an array of numerical values representing a property (such as a grey scale value or magnetic field strength) associable with an anatomical location points referenced by a particular array location. The set of anatomical location points comprises the domain of the image. In 2-D digital images, or slice sections, the discrete array locations are termed pixels. Three-dimensional digital images can be constructed from stacked slice sections through various construction techniques known in the art. The 3-D images are made up of discrete volume elements, also referred to as voxels, composed of pixels from the 2-D images. The pixel or voxel properties can be processed to ascertain various properties about the anatomy of a patient associated with such pixels or voxels.

The process of classifying, identifying, and characterizing image structures is known as segmentation. Once anatomical regions and structures are identified by analyzing pixels and/or voxels, subsequent processing and analysis exploiting regional characteristics and features can be applied to relevant areas, thus improving both accuracy and efficiency of the imaging system. The wide variety of object appearance characteristics and boundary geometry makes image segmentation a very difficult task. In past decades, a number of promising general-purpose approaches, such as classification/labeling/clustering and curve-evolution, have been proposed to solve this problem. In practice, however, structural assumptions of the target objects are often available beforehand thus can be exploited as a prior. The successful incorporation of such prior information plays a key role for realizing efficient and accurate segmentation solutions in general.

The development of medical data segmentation solutions as applied to computer aided diagnosis applications emphasizes the overall system performance, including user-interaction factors. In such context, semi-automatic solutions, requiring minimal user interactions, can be preferred to fully automated solutions for achieving better overall performance. For this reason, a one-click figure-ground segmentation approach is preferred, where a user can provide a data point which roughly indicates a target/figure blob to be segmented out of arbitrary background. A successful solution depends on (1) robustness against variation of the user-given initialization and the different scan settings to relieve the user's labor, (2) run-time efficiency, even with the high-dimensional data, to enhance the user-interactivity, and (3) high accuracy so that the user-interaction results in better performance than a fully automated solution.

SUMMARY OF THE INVENTION

Exemplary embodiments of the invention as described herein generally include methods and systems for semi-automatic figure-ground segmentation solution for blob-like objects in multi-dimensional images. The blob-like structure include various objects of interest that are hard to segment in many application domains, such as tumor lesions in 3D medical data. The embodiment of the present invention are motivated towards computer-aided diagnosis medical applications, justifying a semi-automatic figure-ground approach. An efficient segmentation is realized by combining anisotropic Gaussian model fitting and a likelihood ratio test (LRT)-based nonparametric segmentation in joint space-intensity domain. The robustly fitted Gaussian is exploited to estimate the foreground and background likelihoods for both spatial and intensity variables. The LRT with the bootstrapped likelihoods is the optimal Bayesian classification while automatically determining the LRT threshold. A 3D implementation of one embodiment is applied to the lung nodule segmentation in CT data and validated with 1310 cases. A target nodule is segmented in less than 3 seconds in average.

According to an aspect of the invention, there is provided a method for segmenting a digitized image comprising the steps of providing a digitized volumetric image comprising a plurality of intensities corresponding to a domain of points in an N-dimensional space, providing an approximate location of a target structure in said image, estimating a foreground spatial-intensity likelihood function about said target structure, estimating a background spatial-intensity likelihood function about said target structure, and using said foreground and background spatial-intensity likelihood functions to segment said target structure by determining whether a point about said target structure is inside said target structure.

According to a further aspect of the invention, the method comprises determining an estimated center and an estimated spread of said target structure by fitting an N-dimensional anisotropic Gaussian function to a volume of interest centered about the approximate location and determining the center and the anisotropic spread of said Gaussian function.

According to a further aspect of the invention, the foreground spatial-intensity likelihood function can be factored into a product of a foreground spatial likelihood function and a foreground intensity likelihood function, and said background spatial-intensity likelihood function can be factored into a product of a background spatial likelihood function and a background intensity likelihood function.

According to a further aspect of the invention, the foreground spatial likelihood function is proportional to said anisotropic Gaussian function, and said background intensity likelihood function is a complement of said foreground spatial likelihood function.

According to a further aspect of the invention, the method comprises imposing a window about said target structure, wherein said window is defined as those points whose Mahalanobis distance from said mean of said Gaussian is less than a predetermined constant value, wherein said Mahalanobis distance is computed using said spread of said Gaussian.

According to a further aspect of the invention, the constant value is determined by solving $$|2\pi\Sigma|^{-1/2} \int_{S(c)} \exp\left(-\frac{1}{2}(x-u)^t \Sigma^{-1}(x-u)\right) dx = \frac{|S(c)|}{2|2\pi\Sigma|^{1/2}},$$

wherein $\Sigma$ is said spread, c is said constant value, S(c) is said window, x is a point in said window, and u is the center of said target structure, and $$|S(c)| = \int_{S(c)} dx.$$

According to a further aspect of the invention, the foreground intensity likelihood function is proportional to a foreground intensity difference function weighted by said foreground spatial likelihood function sampled within said window, and said background intensity likelihood function is proportional to a background intensity difference function weighted by said background spatial likelihood function sampled within said window. According to a further aspect of the invention, the proportionality constant is equal to one half the norm of the window.

According to a further aspect of the invention, the foreground and background intensity difference functions comprise Dirac delta functions.

According to a further aspect of the invention, the foreground and background intensity difference functions comprise Parzen functions.

According to a further aspect of the invention, the step of determining whether a point about said target structure is inside said target structure is repeated for every point neighboring said target structure to determine which points comprise said target structure.

According to a further aspect of the invention, determining whether a point is inside said target structure comprises comparing a ratio of said foreground and background spatial-intensity likelihood functions calculated at said point to a preset threshold, wherein said point is classified as inside said target structure if said ratio is greater than said threshold.

According to a further aspect of the invention, determining whether a point is inside said target structure comprises comparing said foreground spatial-intensity likelihood function $f(x, \alpha|in)$ to said background spatial-intensity likelihood function $f(x, \alpha|out)$, wherein said point x is classified as inside said target structure if $f(x, \alpha|in) > f(x, \alpha|out)$.

According to a further aspect of the invention, determining whether a point is inside said target structure comprises comparing a function F of a ratio of said foreground likelihood function to said background likelihood function to F(1) at the point location, wherein the function F is a member of a family of functions $F:R \to R$ that are monotonically and strictly increasing, wherein said point is classified as inside said target structure if the function of said ratio is greater than F(1).

According to a further aspect of the invention, determining whether a point is inside said target structure comprises comparing a function F of said foreground likelihood function $f(x, \alpha|in)$ to a function F of said background likelihood function $f(x, \alpha|out)$ at the point location x, wherein the function F is a member of a family of functions $F:R \to R$ that are monotonically and strictly increasing, and wherein the point x is classified as inside said target structure if $F(f(x, \alpha|in)) \geq F(f(x, \alpha|out))$.

According to another aspect of the invention, there is provided a program storage device readable by a computer, tangibly embodying a program of instructions executable by the computer to perform the method steps for segmenting a digitized image.

DETAILED DESCRIPTION OF THE PREFERRED EMBODIMENTS

Figure 1:
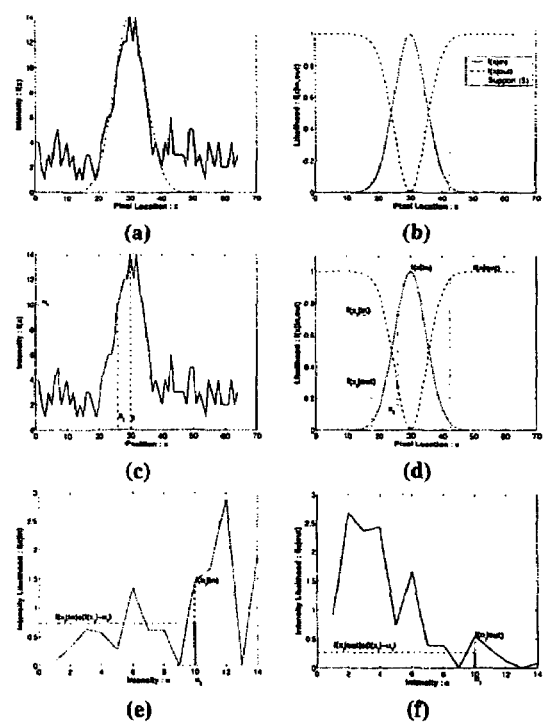
FIGS. 1(a)-(f) illustrate the likelihood estimation processes for a 1D example, according to an embodiment of the invention.

Exemplary embodiments of the invention as described herein generally include systems and methods for an efficient segmentation solution for a class of blob-like structures captured in multi-dimensional medical images. Although an exemplary embodiment of this invention is discussed in the context of segmenting a CT lung nodule, it is to be understood that the object segmentation and shape characterization methods presented herein have application to other multi-dimensional imaging modalities.

As used herein, the term "image" refers to multi-dimensional data composed of discrete image elements (e.g., pixels for 2-D images and voxels for 3-D images). The image may be, for example, a medical image of a subject collected by computer tomography, magnetic resonance imaging, ultrasound, or any other medical imaging system known to one of skill in the art. The image may also be provided from non-medical contexts, such as, for example, remote sensing systems, electron microscopy, etc. Although an image can be thought of as a function from $R^3$ to R, the methods of the inventions are not limited to such images, and can be applied to images of any dimension, e.g. a 2-D picture or a 3-D volume. For a 2- or 3-dimensional image, the domain of the image is typically a 2- or 3-dimensional rectangular array, wherein each pixel or voxel can be addressed with reference to a set of 2 or 3 mutually orthogonal axes. The terms "digital" and "digitized" as used herein will refer to images or volumes, as appropriate, in a digital or digitized format acquired via a digital acquisition system or via conversion from an analog image.

A blob-like structure can be defined as a roughly convex local intensity distribution whose iso-level contours are approximately ellipsoidal, but with some irregularities that do not destroy the ellipsoidal topology. The intensity distribution itself can be multi-modal but can be assumed to be uni-modal under Gaussian blurring within an appropriate upper-bound of the smoothing bandwidth. Such a class of data structures represents various objects of interest, such as tumors and polyps, which are hard to segment in many medical imaging application domains, such as CT lung and PET hot spot segmentation.

According to an embodiment of the invention, a semi-automatic (one-click) blob segmentation method includes two steps. An example of a blob is a tumor. A first step is a pre-processing step with a anisotropic Gaussian fitting. Given an initial marker x indicating an approximate location of the target structure, such as a tumor, the Gaussian fitting provides an estimated target center u and an anisotropic spread matrix $\Sigma$ in the form of Gaussian function:

$$\Phi(x, u, \Sigma) = \frac{\exp\left(-\frac{1}{2}(x-u)^t \Sigma^{-1}(x-u)\right)}{|2\pi\Sigma|^{1/2}}.$$

Note that the notation $(\ldots)^t$ indicated the transpose of a vector (or matrix). The volume of interest (VOI) $\Omega$ can be defined by the extent of the data analysis given by a fixed-size N-D window centered at x. The data to be analyzed is expressed by $I(x) \in R^+$ where $x \in \Omega \subset R^N$ is an N-dimensional coordinate indicating a data (pixel/voxel) location. The resulting multi-scale Gaussian model fitting solution is robust against (1) the influence from non-target neighboring structures, (2) misfit of the data, and (3) variations in the initialization point x. The anisotropic Gaussian fitting procedure is described in the inventors' copending patent application, "Method for Robust Scale-Space Analysis of 3D Local Structures in Medical Images", U.S. patent application Ser. No. 10/892,646, filed Jul. 17, 2004, the contents of which are incorporated herein by reference.

A second step of the segmentation method according to an embodiment of the invention involves using a likelihood test to separate a figure from the background. At each data point $x \in \Omega$ there is an intensity value $\alpha = I(x)$. Treating both x and $\alpha$ as independent random variables, a joint likelihood function of (x, $\alpha$) can be estimated for a foreground, $f(x, \alpha|in)$, where in represents the interior of or part of a target tumor, and for a background, $f(x, \alpha|out)$, where out represents the outside of the tumor. The space-intensity joint likelihoods can be factorized as $f(x, \alpha|in) = f(x|in)f(\alpha|in)$ $f(x, \alpha|out) = f(x, out)f(\alpha|out)$ where $f(x|in)$ and $f(\alpha|in)$, $f(x|out)$ and $f(\alpha|out)$) denote a marginal foreground (background) spatial and intensity likelihood functions, respectively. Although the two variables x and $\alpha$ are not independent in general, experimental results have shown indicate that their dependence is weak, resulting in good segmentation results. A space-intensity joint likelihood ratio r(x) is then defined by $$r(x) \equiv \frac{f(x, \alpha|in)}{f(x, \alpha|out)} = \frac{f(x|in)f(\alpha|in)}{f(x|out)f(\alpha|out)}.$$

Each voxel data point within the VOI can be segmented by performing the likelihood ratio test: $x \in $ in if $r(x) \geq $ th, otherwise $x \in $ out, where th is a threshold which depends on the normalization factors of the foreground and background likelihoods. Modeling the likelihoods within a specific support region assures the Bayesian optimality for th=1. It is to be understood, however, that other threshold values can be used, and the threshold can vary for different sets of points.

It is to be further understood that the likelihood ratio is an exemplary function of the foreground and background joint space-intensity likelihood functions, and other tests involving these likelihood functions can be used and be within the scope of an embodiment of the invention. In one exemplary embodiment, likelihood-based segmentation is performed by comparison of the foreground and background joint space-intensity likelihood functions. Given the positive-valued foreground likelihood function $f(x, \alpha|in)$ and the background likelihood function $f(x, \alpha|out)$ at a point location x, the point x is classified as a member of the foreground if $f(x, \alpha|in) > f(x, \alpha|out)$, otherwise, it is classified as the background. This segmentation scheme is equivalent to the likelihood ratio test based segmentation method. It is preferred to the likelihood ratio test when the background likelihood $f(x, \alpha|out)$ can be zero-valued for some locations x, where the foreground/background ration would not be computable.

In another exemplary embodiment, given the positive-valued foreground likelihood function $f(x, \alpha|in)$ and the background likelihood function $f(x, \alpha|out)$ at a point location x, the point x is classified as a member of the foreground if some function $F(f(x, \alpha|in)/f(x, \alpha|out))$ is larger than or equivalent to F(1) and classified as the background otherwise. The function F is a member of a family of functions $F:R \rightarrow R$ that are monotonically and strictly increasing, i.e., order-preserving.

In another embodiment of the invention, given the positive-valued foreground likelihood function $f(x, \alpha|in)$ and the background likelihood function $f(x, \alpha|out)$ at the point location x, the point x is classified as a member of the foreground if $F(f(x, \alpha|in)) \geq F(f(x, \alpha|out))$ and classified as the background otherwise. Again, the function F is a member of a family of functions $F:R \rightarrow R$ that are monotonically and strictly increasing. Examples of functions that are monotonically and strictly increasing include logarithmic functions, polynomial functions, and exponential functions.

However, it is to be understood that not all functions of the likelihood functions will yield the desired results. Although tests such as $f(x, \alpha|in) > f(x, \alpha|out)$, $\log(f(x, \alpha|in)) > \log(f(x, \alpha|out))$, $\sqrt{(f(x, \alpha|in)/f(x, \alpha|out))} > 1$, etc., will yield consistent results, other tests, such as $(f(x, \alpha|in))^2 > f(x, \alpha|out)$ and $\log(f(x, \alpha|in))/\log(f(x, \alpha|out)) > $ th, will not yield results consistent with the likelihood ratio test method $f(x, \alpha|in)/f(x, \alpha|out) > 1$.

One can realize the segmentation outlined above by defining four likelihood functions for spatial and intensity factors inside and outside the target structure: $f(x|in)$, $f(x|out)$, $f(\alpha|in)$, and $f(\alpha|out)$.

One can obtain the foreground and background spatial likelihoods by assuming that the N-D Gaussian model fitting solution function $\Phi(x, u, \Sigma)$ approximates a probability distribution of a location x being a tumor center or mean u. In many applications, such as tumor segmentation, the surface geometry of the target structure is approximately convex, which assures the mean is located inside of the structure. Thus, according to an embodiment of the invention, the Gaussian model fitting solution function can be interpreted as the conditional probability distribution P(x|in) of x being part of the target tumor structure: $P(x|in) = \Phi(x, u, \Sigma)$. However, the conditional probability distribution for the background, P(x|out) is ill-defined because the background has an infinite extent in the data space x. According to another embodiment of the invention, a support window $S \subset \Omega$ that confines observations of the random variable x can be introduced so that the background has a finite normalization. A pair of normalized conditional probability distributions functions can be defined over the support window as $$\bar{P}(x|in) = P(x|in)/\int_S P(x|in)dx$$

$$\bar{P}(x|out) = P(x|out)/\int_S P(x|out)dx$$

where $P(x|in)$ is known and $P(x|out)$ is an unknown underlying background distribution. The total probability of a data point being in S is $P_x = \bar{P}(x|in)P_{in} + \bar{P}(x|out)P_{out} = 1|S|$, where Pin and Pout are prior probabilities of being inside and outside of S, $P_{in} + P_{out} = 1$. Thus, according to an embodiment of the invention, the background spatial probability distribution can be defined as $$\bar{P}(x|out) = \frac{(1/|s|) - \bar{P}(x|in) \times P_{in}}{(1 - P_{in})}.$$

According to another embodiment of the invention, the inside and outside probabilities are unbiased and can be set equal so that $P_{in} = P_{out} = 0.5$:

$$\bar{P}(x|out) = \frac{2}{|S|} - \bar{P}(x|in) = \frac{2}{|S|} - \frac{P(x|in)}{\int_S P(x|in)dx}$$

According to another embodiment of the invention, the background probability distribution function over S can assume the value zero at the mean location u where the Gaussian function $\Phi(x, u, \Sigma)$ modeling the foreground probability distribution function, takes its maximum. In this embodiment, the normalization factor of $\bar{P}(x|in)$ becomes $$\int_S P(x|in)dx = P(u|in)\frac{|S|}{2} = \frac{|S|}{2|2\pi\Sigma|^{1/2}},$$

and the normalized foreground and background distributions can be defined as $$\bar{P}(x|in) = \frac{2}{|S|}|2\pi\Sigma|^{1/2}P(x|in)$$

$$\bar{P}(x|out) = \frac{2}{|S|}(1 - |2\pi\Sigma|^{1/2}P(x|in))$$

The foreground and background spatial likelihood functions can be defined in terms as the conditional probability distribution functions over S scaled by a fixed factor $|S|/2$ so that they depend only on $P(x|in)$:

$$f(x|in) \equiv \frac{|S|}{2}\bar{P}(x|in) = |2\pi\Sigma|^{1/2}P(x|in)$$

$$f(x|out) \equiv \frac{|S|}{2}\bar{P}(x|out) = 1 - |2\pi\Sigma|^{1/2}P(x|in).$$

Note that the background likelihood $f(x|out)$ is a complement of the foreground likelihood. At the mean location u, $f(u|in)$ =1 and $f(u|out)=0$. At infinity, $f(\pm\infty|in)=0$ and $f(\pm\infty|out)=1$. In addition, since the likelihood functions share a common scaling factor, the ratio of the likelihood functions is equivalent to the ratio of the distribution functions.

The choice of the support window S can effect the segmentation solution. As previously described, the background can have an infinite spatial extent, and thus a background spatial likelihood function is not bounded and would have an infinite normalization factor. For this reason, a support window S was introduced so that probability distributions can be defined within such a window. However, the estimated background likelihood will be sensitive to the varying range of S since such variation of the support S would cause a large change to the normalization factor.

According to an embodiment of the invention, the support window S can be a function of the target scale. For example, if a cup on a table is to be segmented, it is sensible to model the background using specific information from the table, not of the house in which the table is placed nor of the city in which the house is present. The Gaussian function fitted to the target structure by the pre-process can provide such scale information in the form of a confidence ellipsoid of N-dimensional equal-probability contour approximating the structure boundary. Utilizing this, the support window S can be parameterized as a function of the ellipsoid:

$$S(c) \equiv \{x|(x-u)^t\Sigma^{-1}(x-u) \leq c\}$$

where the scalar c is the Mahalanobis distance of x from u with covariance $\Sigma$. The constant c can be determined from $$|S(c)| = \int_{S(c)} dx$$

and the normalization of $P(x|in)$:

$$\int_{S(c)} P(x|in)dx = \frac{|S(c)|}{2|2\pi\Sigma|^{1/2}} = |2\pi\Sigma|^{-1/2}\int_{S(c)} \exp\left(-\frac{1}{2}(x-u)^t\Sigma^{-1}(x-u)\right)dx.$$

The solution S(c) depends on the dimensionality N of the data space x. For example, numerical solutions of the above equation for 1D, 2D and 3D cases are: $c_1 \approx 6.1152$, $c_2 \approx 3.1871$, and $c_3 \approx 2.4931$. Within this support window, the probability mass of $f(x|in)$ and $f(x|out)$ over S are equivalent.

For the 3D segmentation, $c_3 = 2.4931$ amounts to an approximate 52% confidence interval of the chi-square distribution with three degrees of freedom. Empirically, previous studies for 3D tumor segmentation indicate that the equal-probability contour with $c_3 = 1.6416$, derived from 35% confidence interval of the fitted Gaussian function, approximates the tumor boundary well. This suggests that $S(c_3)$ derived above provides a data range that covers the complete foreground and includes only a thin layer of background region around the target. This is an appropriate support window for modeling the background because the background model estimated over this support window will not be strongly influenced by the non-target neighboring structures that may appear within the VOI.

One can obtain the foreground and background intensity likelihoods by defining the conditional intensity probability distributions as a function of intensity differences weighted by the corresponding normalized spatial probability distributions and sampled over the support window S:

$$\overline{P}(\alpha \mid \text{in}) \equiv \int_S \overline{P}(x, \alpha \mid \text{in}) dx = \int_S \overline{P}(x \mid \text{in}) \phi(I(x) - \alpha) dx$$

$$\overline{P}(\alpha \mid \text{out}) \equiv \int_S \overline{P}(x, \alpha \mid \text{out}) dx = \int_S \overline{P}(x \mid \text{out}) \phi(I(x) - \alpha) dx$$

where $\overline{P}(\alpha \mid x, \{\text{in/out}\})$ is modeled by $\phi(I(x) - \alpha)$. The function $\phi$ should be localized and have finite normalization. There are several possibilities for this function. In one embodiment of the invention, to assure unit-normalization over the support window S, the function $\phi$ can be set to the discrete Dirac delta function. According to another embodiment of the invention, for estimating a continuous probability distribution function from a small number of samples, a Parzen function with a uniform step kernel can be used as $\phi$ while maintaining the unit-normalization. Replacing the spatial conditional distributions by the likelihood functions yields $$\overline{P}(\alpha \mid \text{in}) = \frac{2}{|S|} \int_S f(x \mid \text{in}) \phi(I(x) - \alpha) dx$$

$$\overline{P}(\alpha \mid \text{out}) = \frac{2}{|S|} \int_S f(x \mid \text{out}) \phi(I(x) - \alpha) dx$$

Similar to the spatial likelihood functions, the intensity likelihood functions can be defined as scaled conditional distribution functions with a fixed factor $|S|/2$ sampled over the support window S:

$$f(\alpha \mid \text{in}) \equiv \frac{|S|}{2} \overline{P}(\alpha \mid \text{in}) = \int_S f(x \mid \text{in}) \phi(I(x) - \alpha) dx$$

$$f(\alpha \mid \text{out}) \equiv \frac{|S|}{2} \overline{P}(\alpha \mid \text{out}) = \int_S f(x \mid \text{out}) \phi(I(x) - \alpha) dx$$

The techniques for likelihood estimation according to embodiments of the present invention do not require iterative model updates since the Gaussian fitting step provides a robust and accurate target characterization, captured in $f(x|\text{in})$ and $f(x|\text{out})$.

FIGS. 1(a)-(f) illustrate the likelihood estimation processes for a 1D example, according to an embodiment of the invention. FIG. 1(a) depicts 1D noisy data with a Gaussian fitted by the pre-process. FIG. 1(b) depicts foreground (solid) and background (dash) spatial likelihoods and the support window (dot-dash), derived from the Gaussian. Given the fitted Gaussian shown by a dash-curve in FIG. 1(a), the foreground (solid) and background (dash) likelihoods are analytically determined as shown in FIG. 1(b). Because both fore- and back-ground likelihoods share the same scaling factor, the ratio of the likelihoods and that of the probability distribution functions become equivalent.

FIGS. 1(c)-(f) illustrate the intensity likelihood estimation processes. FIG. 1(c) illustrates the data, indicating with the solid lines a pair of pixel location and intensity values $(x_i, \alpha_i)$. FIG. 1(d) illustrates the spatial likelihoods, showing the foreground (solid) and background (dashed) likelihoods at $x_i$. FIG. 1(e) depicts the foreground intensity likelihood, showing contributions (dashed lines) from the data point $(x_i, \alpha_i)$. FIG. 1(f) depicts the background intensity likelihood, showing contribution (dashed lines) from $(x_i, \alpha_i)$. Using all data within the support window $(x_i \in S, \alpha_i)$, the foreground (FIG. 1(e)) and background (FIG. 1(f)) intensity likelihoods are estimated by accumulating $\phi$-smoothed counts for each intensity value $\alpha_i$ weighted by the corresponding spatial likelihoods $f(x_i|\text{in})$ and $f(x_i|\text{out})$ shown in FIG. 1(d).

With the spatial and intensity likelihood functions derived above, the joint likelihood ratio r(x) can be expressed as:

$$r(x) = \frac{|2\pi\Sigma|^{1/2}\Phi(x, u, \Sigma) \int_S |2\pi\Sigma|^{1/2}\Phi(x, u, \Sigma)\phi(I(x) - \alpha)dx}{(1 - |2\pi\Sigma|^{1/2}\Phi(x, u, \Sigma)) \int_S (1 - |2\pi\Sigma|^{1/2}\Phi(x, u, \Sigma))\phi(I(x) - \alpha)dx}$$

This shows that the likelihood ratio at x with intensity value a depends only on $\Phi(x, u, \Sigma)$ and $I(x \in S)$. The formal derivations presented above assure that the ratios of the foreground and background likelihoods are equivalent to the ratios of the posterior probability distribution functions normalized over the support window S(c). Thus, r(x) can be rewritten with such posterior probability distribution functions given the independence of x and $\alpha$ and $P_{in} = P_{out}$:

$$r(x) = \frac{\overline{P}(\text{in} \mid x)\overline{P}(\text{in} \mid \alpha)}{\overline{P}(\text{out} \mid x)\overline{P}(\text{out} \mid \alpha)} = \frac{\overline{P}(\text{in} \mid (x, \alpha))}{\overline{P}(\text{out} \mid (x, \alpha))}$$

Thus, this joint likelihood ratio test segmentation is an optimal Bayesian binary classification of each voxel with a uniform cost when the likelihoods presented herein above are used and the likelihood ratio test threshold th in is set to one.

Figure 2:
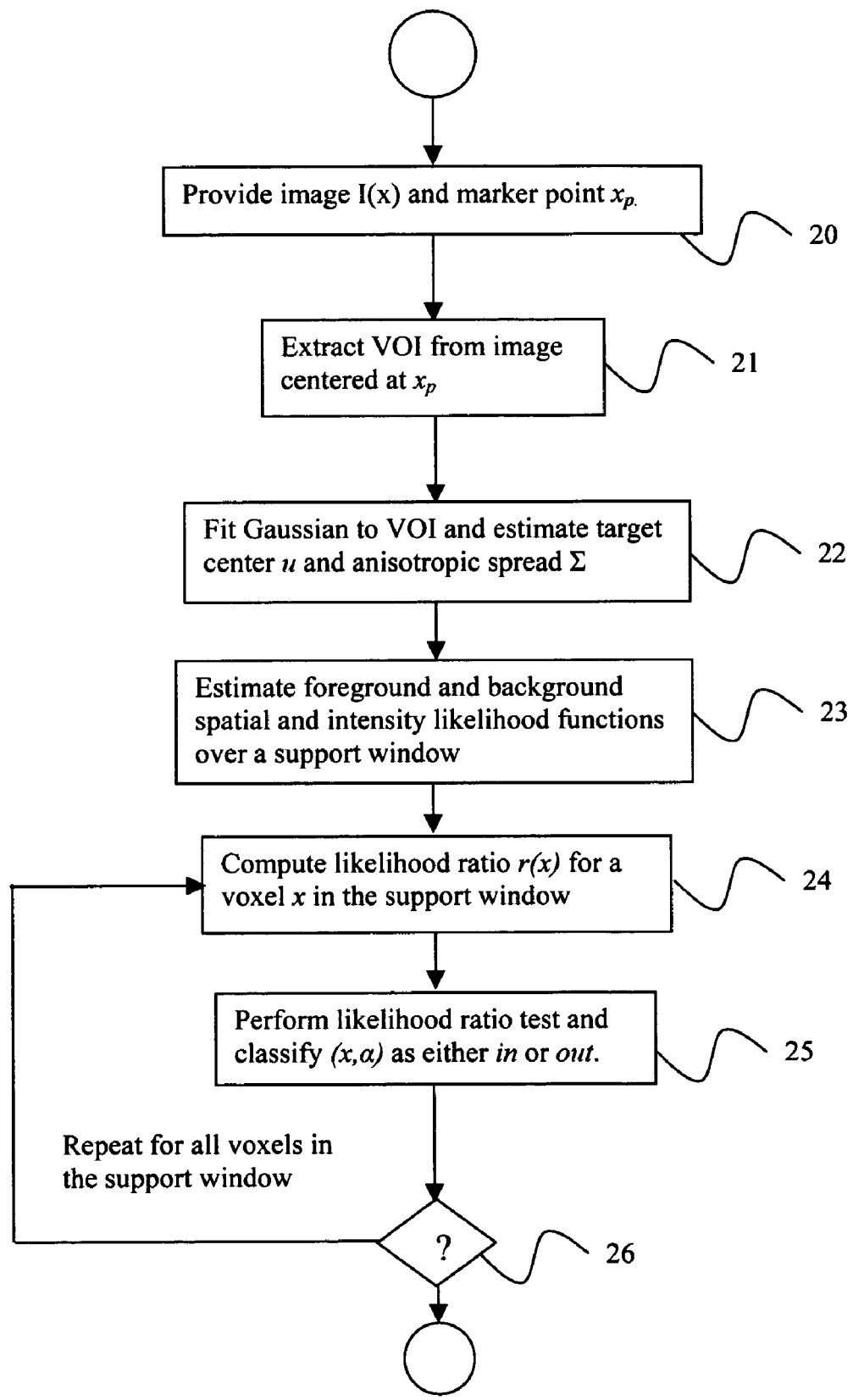
FIG. 2 depicts a flow chart of a joint space-intensity likelihood ratio test based segmentation method, according to an embodiment of the invention.

FIG. 2 depicts a flow chart of a joint space-intensity likelihood ratio test based segmentation method, according to an embodiment of the invention. The segmentation method begins by providing at step 20 an image volume I(x) with a marker $x_p$ indicating an approximate location of a target structure, such as a blob or a tumor. At step 21, a volume of interest VOI=I(x∈Ω), centered at $x_p$, is extracted from the image volume I. At step 22, an anisotropic Gaussian fitting is performed, resulting in an estimate of the target center u and anisotropic spread matrix $\Sigma$. At step 23, given the estimated target center and spread (u, $\Sigma$) and the VOI=I(x∈Ω), the foreground and background spatial and intensity likelihood functions are estimated over a support window S. At step 24, for a voxel x in the support window and its associated intensity $\alpha$, the likelihood ratio r(x) is computed from the spatial-intensity joint likelihood functions. At step 25, the likelihood ratio test is performed to determine if the voxel is inside or outside the target structure: x∈in if r(x)≧th, otherwise x∈out, where th is a threshold that is optimally set to one, and in and out label the inside and outside of the target structure, respectively. At step 26, the preceding 2 steps, step 24 and 25, are repeated for all voxels within the support window.

A 3D implementation according to an embodiment of the invention was applied to delineating a target lung nodule from background lung parenchyma in the presence of other non-target structures such as vessels and lung walls. The performance was evaluated by using high resolution chest CT images of 39 patients including 1310 lung nodules. The images are of size 512×512×400 voxels (depth slightly varies across the patients) with a 12 bit intensity range. For each lung tumor, an approximate location marker is provided by an expert radiologist. The size of VOI is fixed to be 33×33×33 voxels.

FIGS. 3(a)-(d) illustrate examples of segmentation results for four tumor cases, according to an embodiment of the invention. Each column of an example corresponds to the segmentation results on yz, xz, xy planes, respectively, passing through the estimated tumor center u. The first row of each example depicts the segmentation results without using the derived support window S. In this case, the intensity likelihoods are estimated by using all samples within the 33×3×33 VOI. The second row depicts the likelihood ratio segmentation results using the derived support window S. The third row depicts results from a 4D space-intensity joint-domain mean shift segmentation. The results presented here illustrate that a likelihood ratio based segmentation solution with a support window successfully performs 3D lung tumor boundary segmentation, while the mean shift and the likelihood ratio without S tend to under-and over-estimate the tumor boundary, respectively.

Figure 3:
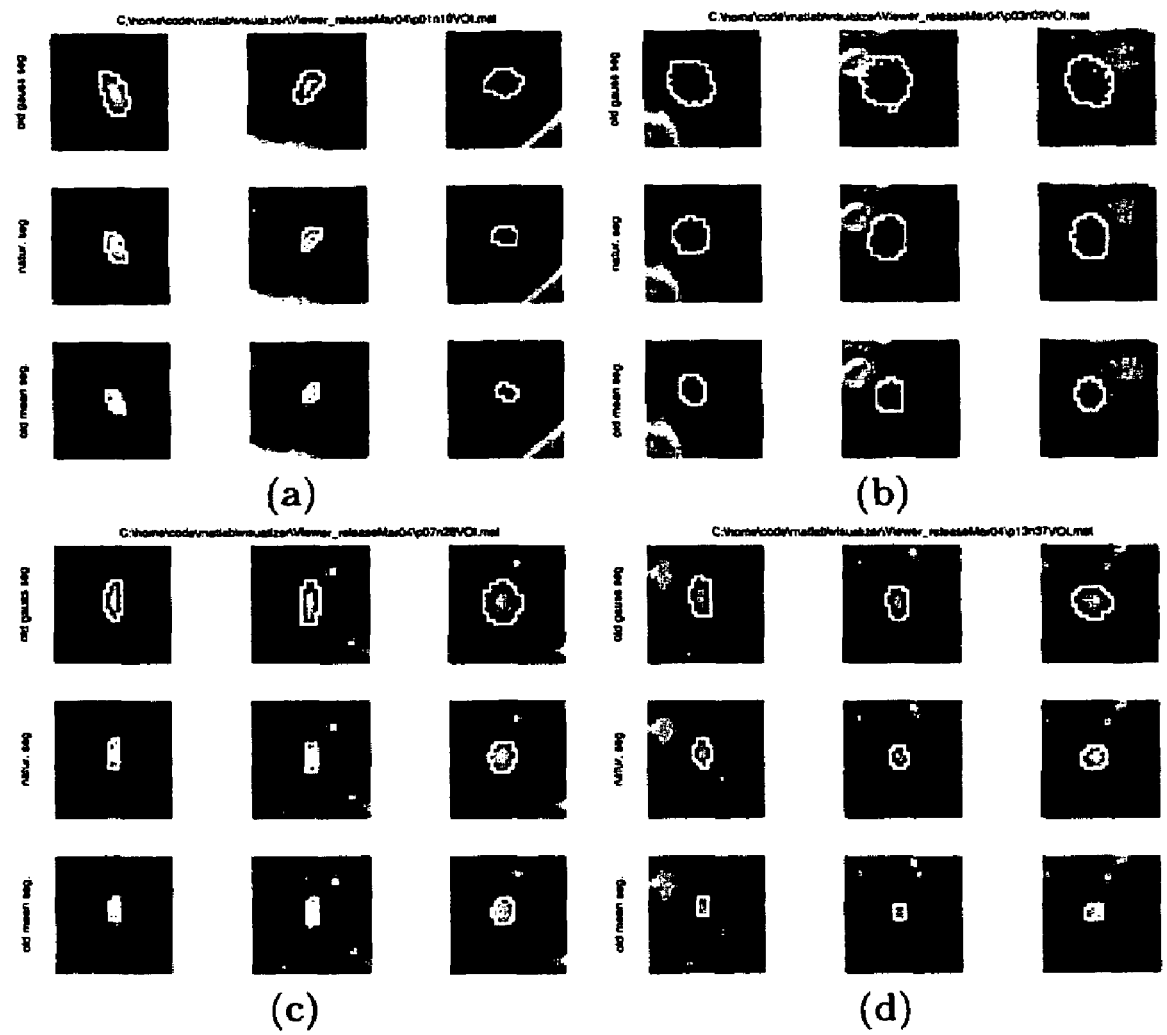
FIGS. 3(a)-(d) illustrate examples of segmentation results for four tumor cases, according to an embodiment of the invention.
Figure 4:
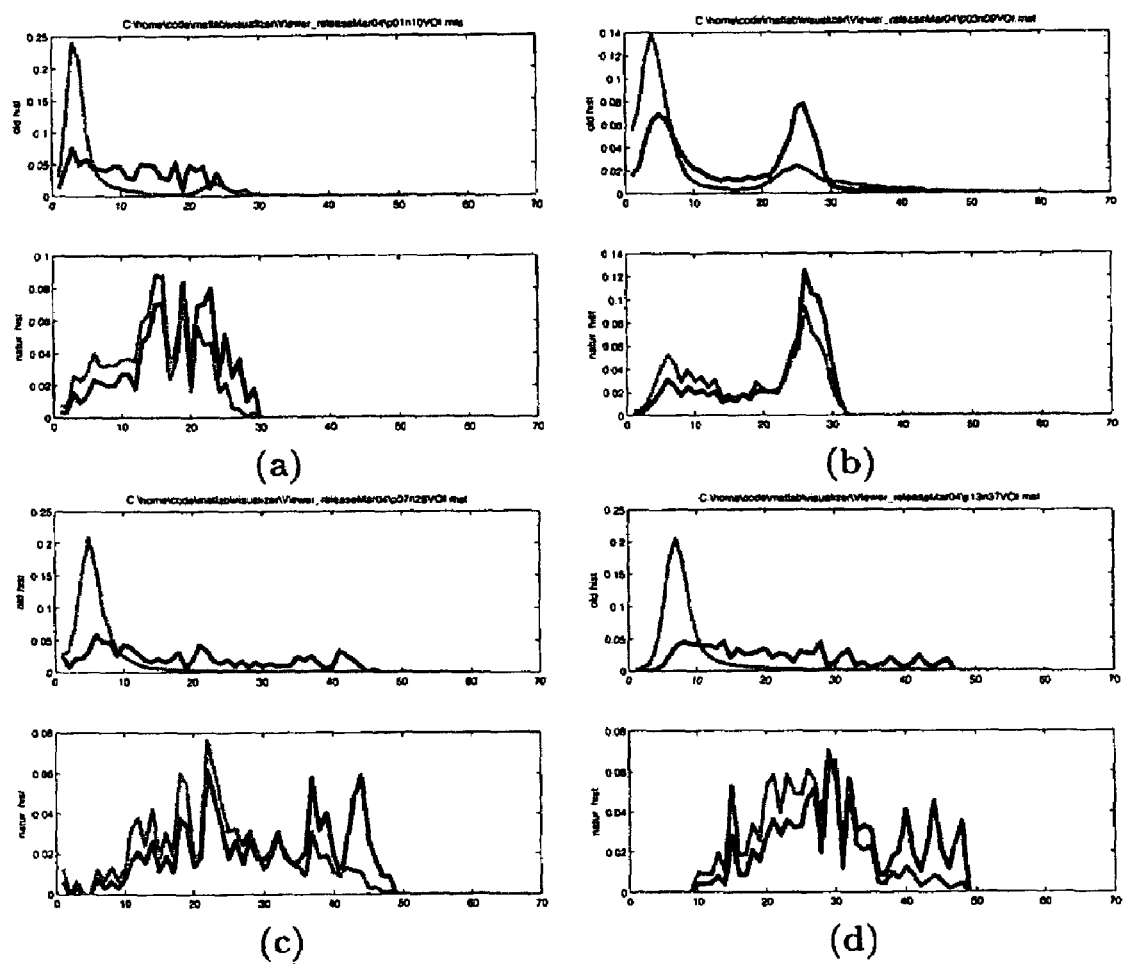
FIGS. 4(a)-(d) shows the intensity likelihood models estimated for the four cases in FIGS. 3(a)-(d), according to an embodiment of the invention.

FIGS. 4(*a*)-(*d*) shows the intensity likelihood models $f(\alpha|in)$ and $f(\alpha|out)$ estimated for the four cases in FIGS. 3(*a*)-(*d*), according to an embodiment of the invention. In each example, the dark and light lines denote the foreground and the background models, respectively. The first row of each example illustrate the likelihoods computed with all samples in the VOI, while the second rows illustrate those computed with the support S. The background likelihoods without S, covering a large background region, tend to over-sample the lung parenchyma regions with low intensity values (expressed by a high peak at the low intensity range). This over-sampling excessively suppresses the background likelihood at the higher intensity values, resulting in a falsely large intensity range in which the foreground likelihood surpasses the background one. This is an obvious cause for the over-estimation by this solution. The solution with the support window S, however, employs the background intensity model estimated with samples only within S. This in effect reduces the intensity range to an appropriate size, resulting in better segmentation. Example (d) illustrates this effect clearly, where the solution without S does not effectively discriminate the intensity information.

Figure 5:
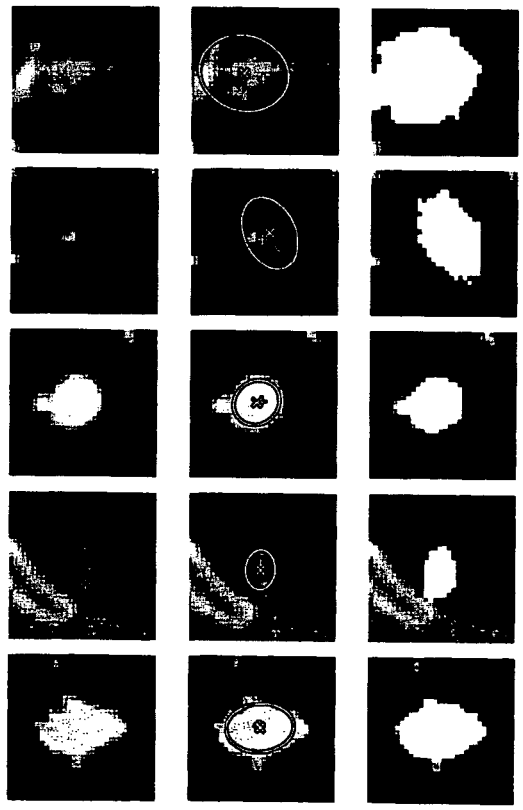
FIG. 5 illustrates examples of 2D views of 3D segmentation results for five tumor cases, according to an embodiment of the invention.

FIG. 5 illustrates examples of 2D views of 3D segmentation results for five tumor cases, according to an embodiment of the invention. These cross sectional views pass through the estimated tumor center u. The left column illustrates the input data. The middle column illustrates an anisotropic Gaussian fitted to the data. A "+" in the image indicates the marker $x_p$, an "%" indicates the estimated center u, and the ellipses in the image indicate the image-plane intersection of the 35% confidence ellipsoid of the estimated Gaussian. The right column illustrates segmentation results shown as grayscale images with the segmented regions filled in with a white value. These results illustrate the capability of a joint spatial-intensity likelihood ratio based segmentation to handle irregular 3D boundary geometries. The fourth row of the figure also illustrates a case where the presence of a neighboring lung wall was segmented correctly.

With the 1310 tumor cases, the Gaussian fitting pre-process successfully s approximated the tumor boundary for 1139 cases. Most of the failures were due to a few isolated voxels near the target boundary being falsely segmented as a part of the target when non-target structures were present nearby. This can be mitigated by performing a connected component analysis as a post-process. After such a post-process, the error rate reduces to only 1% (11 cases). On average, a method according to an embodiment of the invention can run in less than 3 seconds with a 2.4 GHz Pentium IV processor, or 3 times faster than a mean shift solution.

It is to be understood that the present invention can be implemented in various forms of hardware, software, firmware, special purpose processes, or a combination thereof. In one embodiment, the present invention can be implemented in software as an application program tangible embodied on a computer readable program storage device. The application program can be uploaded to, and executed by, a machine comprising any suitable architecture.

Figure 6:
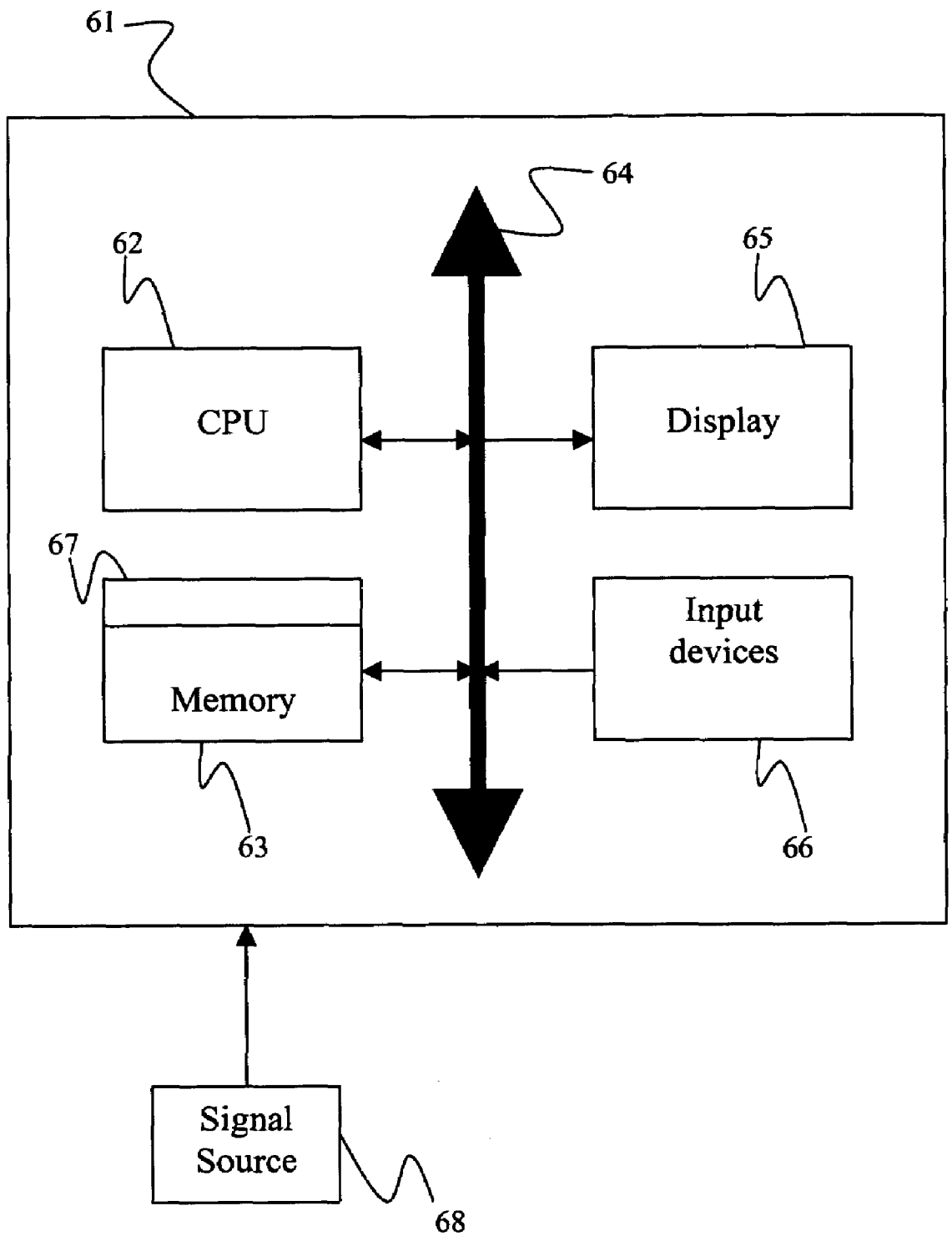
FIG. 6 is a block diagram of an exemplary computer system for implementing a joint space-intensity likelihood ratio test based segmentation method, according to an embodiment of the invention.

FIG. 6 is a block diagram of an exemplary computer system for implementing a toboggan-based object characterization scheme according to an embodiment of the invention. Referring now to FIG. 6, a computer system 61 for implementing the present invention can comprise, inter alia, a central processing unit (CPU) 62, a memory 63 and an input/output (I/O) interface 64. The computer system 61 is generally coupled through the I/O interface 64 to a display 65 and various input devices 66 such as a mouse and a keyboard. The support circuits can include circuits such as cache, power supplies, clock circuits, and a communication bus. The memory 63 can include random access memory (RAM), read only memory (ROM), disk drive, tape drive, etc., or a combinations thereof. The present invention can be implemented as a routine 67 that is stored in memory 63 and executed by the CPU 62 to process the signal from the signal source 68. As such, the computer system 61 is a general purpose computer system that becomes a specific purpose computer system when executing the routine 67 of the present invention.

The computer system 61 also includes an operating system and micro instruction code. The various processes and functions described herein can either be part of the micro instruction code or part of the application program (or combination thereof) which is executed via the operating system. In addition, various other peripheral devices can be connected to the computer platform such as an additional data storage device and a printing device.

It is to be further understood that, because some of the constituent system components and method steps depicted in the accompanying figures can be implemented in software, the actual connections between the systems components (or the process steps) may differ depending upon the manner in which the present invention is programmed. Given the teachings of the present invention provided herein, one of ordinary skill in the related art will be able to contemplate these and similar implementations or configurations of the present invention.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed is:

1. A method for segmenting a digitized image comprising the steps of:

providing a digitized volumetric image comprising a plurality of intensities corresponding to a domain of points in an N-dimensional space;

providing an approximate location of a target structure in said image;

estimating a foreground spatial-intensity likelihood function about said target structure;

estimating a background spatial-intensity likelihood function about said target structure; and using said foreground and background spatial-intensity likelihood functions to segment said target structure by determining whether a point about said target structure is inside said target structure.

2. The method of claim 1, further comprising determining an estimated center and an estimated spread of said target structure by fitting an N-dimensional anisotropic Gaussian function to a volume of interest centered about the approximate location and determining the center and the anisotropic spread of said Gaussian function.

3. The method of claim 2, wherein said foreground spatial-intensity likelihood function can be factored into a product of a foreground spatial likelihood function and a foreground intensity likelihood function, and said background spatial-intensity likelihood function can be factored into a product of a background spatial likelihood function and a background intensity likelihood function.

4. The method of claim 3, wherein said foreground spatial likelihood function is proportional to said anisotropic Gaussian function, and said background intensity likelihood function is a complement of said foreground spatial likelihood function.

5. The method of claim 3, further comprising imposing a window about said target structure, wherein said window is defined as those points whose Mahalanobis distance from said mean of said Gaussian is less than a predetermined constant value, wherein said Mahalanobis distance is computed using said spread of said Gaussian.

6. The method of claim 5, wherein said constant value is determined by solving $$|2\pi\Sigma|^{-1/2} \int_{S(c)} \exp\left(-\frac{1}{2}(x-u)^t \Sigma^{-1}(x-u)\right) dx = \frac{|S(c)|}{2|2\pi\Sigma|^{1/2}},$$

wherein $\Sigma$ is said spread, c is said constant value, S(c) is said window, x is a point in said window, and u is the center of said target structure, and $$|S(c)| = \int_{S(c)} dx.$$

7. The method of claim 5, wherein said foreground intensity likelihood function is proportional to a foreground intensity difference function weighted by said foreground spatial likelihood function sampled within said window, and said background intensity likelihood function is proportional to a background intensity difference function weighted by said background spatial likelihood function sampled within said window.

8. The method of claim 7, wherein said proportionality constant is equal to one half the norm of the window.

9. The method of claim 7, wherein the foreground and background intensity difference functions comprise Dirac delta functions.

10. The method of claim 7, wherein the foreground and background intensity difference functions comprise Parzen functions.

11. The method of claim 1, wherein said step of determining whether a point about said target structure is inside said target structure is repeated for every point neighboring said target structure to determine which points comprise said target structure.

12. The method of claim 1, wherein determining whether a point is inside said target structure comprises comparing a ratio of said foreground and background spatial-intensity likelihood functions calculated at said point to a preset threshold, wherein said point is classified as inside said target structure if said ratio is greater than said threshold.

13. The method of claim 1, wherein determining whether a point is inside said target structure comprises comparing said foreground spatial-intensity likelihood function $f(x, \alpha|in)$ to said background spatial-intensity likelihood function $f(x, \alpha|out)$, wherein said point x is classified as inside said target structure if $f(x, \alpha|in) > f(x, \alpha|out)$.

14. The method of claim 1, wherein determining whether a point is inside said target structure comprises comparing a function F of a ratio of said foreground likelihood function to said background likelihood function to F(1) at the point location, wherein the function F is a member of a family of functions $F:R \rightarrow R$ that are monotonically and strictly increasing, wherein said point is classified as inside said target structure if the function of said ratio is greater than F(1).

15. The method of claim 1, wherein determining whether a point is inside said target structure comprises comparing a function F of said foreground likelihood function $f(x, \alpha|in)$ to a function F of said background likelihood function $f(x, \alpha|out)$ at the point location x, wherein the function F is a member of a family of functions $F:R \rightarrow R$ that are monotonically and strictly increasing, and wherein the point x is classified as inside said target structure if $F(f(x, \alpha|in)) \geq F(f(x, \alpha|out))$.

16. A method for segmenting a digitized image comprising the steps of:
providing a digitized volumetric image comprising a plurality of intensities corresponding to a domain of points in an N-dimensional space;
identifying a target structure in said image;
forming a window about said target structure whose size is a function of the target scale; and
performing a joint space-intensity-likelihood ratio test at each point within said window to determine whether each said point is within said target structure; wherein performing a joint space-intensity-likelihood ratio test further comprises:
estimating a foreground spatial-intensity likelihood function over a window encompassing said target structure;
estimating a background spatial-intensity likelihood function over said window encompassing said target structure; and
comparing a ratio of said foreground and background spatial-intensity likelihood functions to a preset threshold to determine whether a point in said window is inside said target structure.

17. The method of claim 16, wherein identifying a target structure comprises providing a marker point within said target structure and fitting an N-dimensional anisotropic Gaussian function about said marker point and determining a center and an anisotropic spread of said Gaussian function.

18. A program storage device readable by a computer, tangibly embodying a program of instructions executable by the computer to perform the method steps for segmenting a digitized image, the method comprising the steps of:
providing a digitized volumetric image comprising a plurality of intensities corresponding to a domain of points in an N-dimensional space;
providing an approximate location of a target structure in said image;
estimating a foreground spatial-intensity likelihood function about said target structure;
estimating a background spatial-intensity likelihood function about said target structure; and using said foreground and background spatial-intensity likelihood functions to segment said target structure by determining whether a point about said target structure is inside said target structure.

19. The computer readable program storage device of claim 18, the method further comprising determining an estimated center and an estimated spread of said target structure by fitting an N-dimensional anisotropic Gaussian function to a volume of interest centered about the approximate location and determining the center and the anisotropic spread of said Gaussian function.

20. The computer readable program storage device of claim 19, wherein said foreground spatial-intensity likelihood function can be factored into a product of a foreground spatial likelihood function and a foreground intensity likelihood function, and said background spatial-intensity likelihood function can be factored into a product of a background spatial likelihood function and a background intensity likelihood function.

21. The computer readable program storage device of claim 20, wherein said foreground spatial likelihood function is proportional to said anisotropic Gaussian function, and said background intensity likelihood function is a complement of said foreground spatial likelihood function.

22. The computer readable program storage device of claim 20, the method further comprising imposing a window about said target structure, wherein said window is defined as those points whose Mahalanobis distance from said mean of said Gaussian is less than a predetermined constant value, wherein said Mahalanobis distance is computed using said spread of said Gaussian.

23. The computer readable program storage device of claim 22, wherein said constant value is determined by solving $$|2\pi\Sigma|^{-1/2} \int_{S(c)} \exp\left(-\frac{1}{2}(x-u)^t \Sigma^{-1}(x-u)\right) dx = \frac{|S(c)|}{2|2\pi\Sigma|^{1/2}},$$

wherein $\Sigma$ is said spread, c is said constant value, S(c) is said window, x is a point in said window, and u is the center of said target structure, and $$|S(c)| = \int_{S(c)} dx.$$

24. The computer readable program storage device of claim 22, wherein said foreground intensity likelihood function is proportional to a foreground intensity difference function weighted by said foreground spatial likelihood function sampled within said window, and said background intensity likelihood function is proportional to a background intensity difference function weighted by said background spatial likelihood function sampled within said window.

25. The computer readable program storage device of claim 24, wherein said proportionality constant is equal to one half the norm of the window.

26. The computer readable program storage device of claim 24, wherein the foreground and background intensity difference functions comprise Dirac delta functions.

27. The computer readable program storage device of claim 24, wherein the foreground and background intensity difference functions comprise Parzen functions.

28. The computer readable program storage device of claim 18, wherein said step of determining whether a point about said target structure is inside said target structure is repeated for every point neighboring said target structure to determine which points comprise said target structure.

29. The computer readable program storage device of claim 18, wherein determining whether a point is inside said target structure comprises comparing a ratio of said foreground and background spatial-intensity likelihood functions calculated at said point to a preset threshold, wherein said point is classified as inside said target structure if said ratio is greater than said threshold.

30. The computer readable program storage device of claim 18, wherein determining whether a point is inside said target structure comprises comparing said foreground spatial-intensity likelihood function $f(x, \alpha|\text{in})$ to said background spatial-intensity likelihood function $f(x, \alpha|\text{out})$, wherein said point x is classified as inside said target structure if $f(x, \alpha|\text{in}) > f(x, \alpha|\text{out})$.

31. The computer readable program storage device of claim 18, wherein determining whether a point is inside said target structure comprises comparing a function F of a ratio of said foreground likelihood function to said background likelihood function to F(1) at the point location, wherein the function F is a member of a family of functions $F:R \rightarrow R$ that are monotonically and strictly increasing, wherein said point is classified as inside said target structure if the function of said ratio is greater than F(1).

32. The computer readable program storage device of claim 18, wherein determining whether a point is inside said target structure comprises comparing a function F of said foreground likelihood function $f(x, \alpha|\text{in})$ to a function F of said background likelihood function $f(x, \alpha|\text{out})$ at the point location x, wherein the function F is a member of a family of functions $F:R \rightarrow R$ that are monotonically and strictly increasing, and wherein the point x is classified as inside said target structure if $F(f(x, \alpha|\text{in})) \geq F(f(x, \alpha|\text{out}))$.

* * * * *